United States Patent
Yamamoto et al.

(10) Patent No.: US 9,205,544 B2
(45) Date of Patent: Dec. 8, 2015

(54) FASTENING PART TIGHTENING MANAGEMENT SYSTEM

(75) Inventors: Takeyuki Yamamoto, Tokyo (JP); Michihiro Maeda, Tokyo (JP); Katsuo Tokida, Aichi (JP)

(73) Assignee: SANYO MACHINE WORKS, LTD., Aichi (JP)

(*) Notice: Subject to any disclaimer, the term of this patent is extended or adjusted under 35 U.S.C. 154(b) by 362 days.

(21) Appl. No.: 13/813,449

(22) PCT Filed: Jul. 29, 2011

(86) PCT No.: PCT/JP2011/067496
§ 371 (c)(1),
(2), (4) Date: Mar. 21, 2013

(87) PCT Pub. No.: WO2012/017956
PCT Pub. Date: Feb. 9, 2012

(65) Prior Publication Data
US 2013/0174698 A1 Jul. 11, 2013

(30) Foreign Application Priority Data
Aug. 5, 2010 (JP) .................................. 2010-176350

(51) Int. Cl.
*B25B 23/15* (2006.01)
*B23P 19/06* (2006.01)
(Continued)

(52) U.S. Cl.
CPC ............... *B25B 23/15* (2013.01); *B23P 19/066* (2013.01); *B25B 23/14* (2013.01); *B43K 29/00* (2013.01);
(Continued)

(58) Field of Classification Search
CPC ....... B25B 23/14; B25B 23/15; B23P 19/065; B23P 19/066; G05B 19/41805; G05B 19/41875; G05B 2219/31027; G05B 2219/32181; B43K 29/00
USPC ............... 81/467, 468, 479; 73/21–862.23
See application file for complete search history.

(56) References Cited

U.S. PATENT DOCUMENTS 3,662,629 A * 5/1972 Lance .............................. 81/468
6,405,598 B1 * 6/2002 Bareggi ...................... 73/862.23
7,721,631 B2 * 5/2010 Berg et al. ....................... 81/468
(Continued)

FOREIGN PATENT DOCUMENTS

JP 2000-108048 4/2000
JP 2000-246661 9/2000
(Continued)

OTHER PUBLICATIONS

International Search Report issued Aug. 30, 2011 in International (PCT) Application No. PCT/JP2011/067496.
(Continued)

*Primary Examiner* — Hadi Shakeri
(74) *Attorney, Agent, or Firm* — Wenderoth, Lind & Ponack L.L.P.

(57) ABSTRACT

A fastening part tightening management system (1) that manages a tightening state of a fastening part such as a screw to fix a constituent part of an aircraft in an aircraft assembling process includes a manual torque wrench (2) that tightens a fastening part up to a set torque while activating a tightening torque and detects and transmits tightening torque information acting on the fastening part, a marking pen (3) that performs marking to the fastening part, the tightening operation of which is ended by the manual torque wrench (2), detects a writing pressure in the marking, and transmits marking completion information; an information processing device (5) that determines a tightening state of the fastening part based on the tightening torque information and the marking completion information, and a mobile information terminal (4) that notifies an operator of a determination result obtained by the information processing device (5).

9 Claims, 3 Drawing Sheets

(51) Int. Cl.
    *B25B 23/14*     (2006.01)
    *G05B 19/418*     (2006.01)
    *B43K 29/00*     (2006.01)

(52) U.S. Cl.
    CPC .... *G05B 19/41805* (2013.01); *G05B 19/41875* (2013.01); *G05B 2219/31027* (2013.01); *G05B 2219/32181* (2013.01)

(56) References Cited

U.S. PATENT DOCUMENTS

| | | | |
|---|---|---|---|
| 7,984,657 B2* | 7/2011 | DeRose et al. | 81/479 |
| 8,714,058 B2* | 5/2014 | Gauthier et al. | 81/479 |
| 2008/0178713 A1* | 7/2008 | Long et al. | 81/467 |
| 2010/0170370 A1* | 7/2010 | Yokoyama et al. | 81/479 |

FOREIGN PATENT DOCUMENTS

| | | |
|---|---|---|
| JP | 2004-249388 | 9/2004 |
| JP | 2005-118894 | 5/2005 |
| JP | 3126481 | 10/2006 |
| JP | 2006-301980 | 11/2006 |
| JP | 2008-284661 | 11/2008 |
| JP | 2010-142886 | 7/2010 |

OTHER PUBLICATIONS

International Preliminary Report on Patentability and Written Opinion of the International Searching Authority issued Mar. 21, 2013 in International (PCT) Application No. PCT/JP2011/067496.

* cited by examiner

FASTENING PART TIGHTENING MANAGEMENT SYSTEM

TECHNICAL FIELD

The present invention relates to a fastening part tightening management system that manages a tightening state of a fastening part such as a screw for fastening a constituent part of an aircraft in an aircraft assembling process.

BACKGROUND ART

A screw tightening operation occupies a large part of an aircraft assembling process. In the screw tightening operation, plenty of screws to fix various constituent parts of an aircraft are tightened by a preset manual torque wrench as disclosed in, for example, Patent Document 1. The screw tightening operation is generally performed by one combination of an operator and a supervisor.

As described above, a screw tightening operation included in the aircraft assembling process is not performed by only one operator unlike a screw tightening operation included in an automobile assembling process, but is performed by one combination of an operator and a supervisor. The reason will be described below.

Since an automobile has been assembled by an assembly line operation in the automobile assembling process, an area in which an operator performs a screw tightening operation is limited to a small area. For this reason, in the screw tightening operation, an electric torque wrench supposed to be used in a small area is used. The electric torque wrench is held vertically-movably while being suspended from a ceiling, and is supplied with an electric power through a cable to automatically tighten a screw. As a result, even one operator can relatively easily properly perform the screw tightening operation. In contrast to this, in an aircraft assembling process, since it is substantially impossible to assemble a large-scale aircraft by an assembly line operation, the assembling operation is performed at the same place from beginning to end. For this reason, an area in which one operator performs a screw tightening operation is considerably larger than that in an automobile assembling process. Furthermore, an aircraft assembling operation is generally performed at a place having a very high ceiling. Thus, in the aircraft assembling process, an electric torque wrench is difficult to be suspended from a ceiling. Furthermore, when the electric torque wrench is suspended from a ceiling in the aircraft assembling process, since the workable area of the electric torque wrench is limited to a very small area, a screw tightening operation cannot be efficiently performed. For this reason, in an aircraft assembling process having conditions that are totally different from those in an automobile assembling process, a manual torque wrench, the workable area of which is not limited is used, and the same operation is doubly confirmed by one combination of an operator and a supervisor. The double confirmation can prevent undertightening and overtightening a screw and thereby assure the reliability of a screw tightening operation.

PRIOR ART DOCUMENT

Patent Document

Patent Document 1: Japanese Unexamined Patent Publication No. 2000-246661

SUMMARY OF THE INVENTION

Technical Problems

An aircraft has a large number of constituent parts that require fastening operations by fastening parts such as screws, bolts and nuts. For this reason, the assembling operations of the constituent parts require a great many workers. When a screw tightening operation is performed by one combination of an operator and a supervisor, an employment cost becomes twice as much as that when a tightening operation for fastening parts is performed by only one operator, so that an assembly cost of the aircraft rises disadvantageously.

Thus, a reliable tightening operation for fastening parts is desired to be performed by only one operator. However, in an aircraft assembling process, it is natural that a reliable tightening operation for fastening parts are difficult to be realized by only one operator due to the above differences between the field of aircraft and the field of automobile.

In consideration of the above circumferences, it is a technical object of the present invention to realize a reliable tightening operation for fastening parts even by one operator in an aircraft assembling process and to reliably reduce an aircraft assembly cost.

Solution to Problems

According to the present invention, which has been made to solve the above-mentioned problems, a fastening part tightening management system that manages tightening states of the fastening parts to fix constituent parts of an aircraft in an aircraft assembling process includes: a manual torque wrench that tightens a fastening part up to a set torque while activating a tightening torque and detects and transmits tightening torque information acting on the fastening part; a marking pen that performs marking to the fastening part, the tightening operation of which is ended by the manual torque wrench, detects the marking operation, and transmits marking completion information; an information processing device that determines a tightening state of the fastening part based on the tightening torque information and the marking completion information; and an information terminal that notifies an operator of a determination result obtained by the information processing device. The aircraft assembling process mentioned here includes not only an assembling process in manufacturing an aircraft but also an assembling process performed when the manufactured aircraft is checked out. The tightening torque information acting on the fastening part need not be information representing a tightening torque value itself as long as the tightening torque information has a predetermined relation to the tightening torque value (for example, a value of distortion acting on the torque wrench).

With the above configuration, when the operator uses the manual torque wrench to perform a tightening operation for a fastening part, tightening torque information acting on the fastening part is transmitted from the torque wrench. Furthermore, when the operator performs marking to the tightened fastening part with the marking pen to visually check after the tightening operation, the marking completion information is transmitted from the marking pen. A tightening state of the fastening part is determined based on the tightening torque information and the marking completion information. More specifically, it can be determined whether the fastening part is tightened up to a proper tightening torque based on the tightening torque information, and it can be confirmed that marking is performed to the fastening part, the tightening operation of which is properly ended based on the marking completion information. Since the operator is notified of determination results of the information processing device through the information terminal, one operator can reliably tighten the fastening part up to the proper tightening torque without a supervisor while preventing the fastening part from being forgotten to be tightened.

In the above configuration, at least one of the tightening torque information and the marking completion information may be transmitted to the information processing device through the information terminal.

In this manner, since transmittable ranges of the manual torque wrench and the marking pen can be shortened, the sizes and the weights of transmitting units thereof can be reduced. Thus, the tightening operation for the fastening part and the marking operation by the marking pen can be improved in workability.

In the above configuration, the information terminal preferably includes storage means that stores information transmitted to the information processing device through the information terminal, the information including at least one of the tightening torque information and the marking completion information.

In this manner, since the tightening torque information and/or the marking completion information is stored in the storage means of the information terminal, even though a communication state between the information terminal and the information processing device is temporarily poor, the tightening torque information and/or the marking completion information stored in the storage means after the communication state therebetween is improved can be transmitted. For this reason, the corresponding information can be reliably transmitted to the information processing device. In this case, since the information terminal, the torque wrench, and the marking pen should be carried by the operator, a condition in which the communication state therebetween becomes poor occurs difficultly more than a condition in which the communication state between the information terminal and the information processing device becomes poor. For this reason, the tightening torque information and/or the marking completion information is transmitted through the information terminal. To reliably manage the tightening state of the fastening part, both the tightening torque information and the marking completion information are transmitted to the information processing device through the information terminal, and both the pieces of information are preferably stored in the storage means of the information terminal.

In the above configuration, the information terminal includes information input means to input identification information related to a tightening operation for the fastening part, and the identification information may be transmitted to the information processing device.

In this manner, the operator can manage a tightening state of the fastening part while correctly comprehending an operation actually performed by the operator.

In this case, the information processing device may include storage means that stores operation procedure information of a tightening operation for the fastening part and determining means that compares the identification information and the operation procedure information with each other to determine whether the tightening operation is proper.

In this manner, since it can be determined whether an operation procedure actually performed by the operator is erroneous, the operator can execute a tightening operation for the fastening part by a proper operation procedure. More specifically, since an aircraft has a large number of constituent parts, even though tightening operations for the respective constituent parts are proper, correct assembly may not be finished if there is any error in the assembling procedure. In order to very advantageously prevent this, the tightening operations for the fastening parts are managed while being collated with the operation procedure performed by the operator as in the above configuration.

Advantageous Effects of Invention

As described above, according to the present invention, since one operator can realize a reliable tightening operation for a fastening part without a supervisor in an aircraft assembling process, an assembly cost of an aircraft can be reliably reduced.

DESCRIPTION OF EMBODIMENTS

An embodiment of the present invention will be described below with reference to the accompanying drawings.

Figure 1:
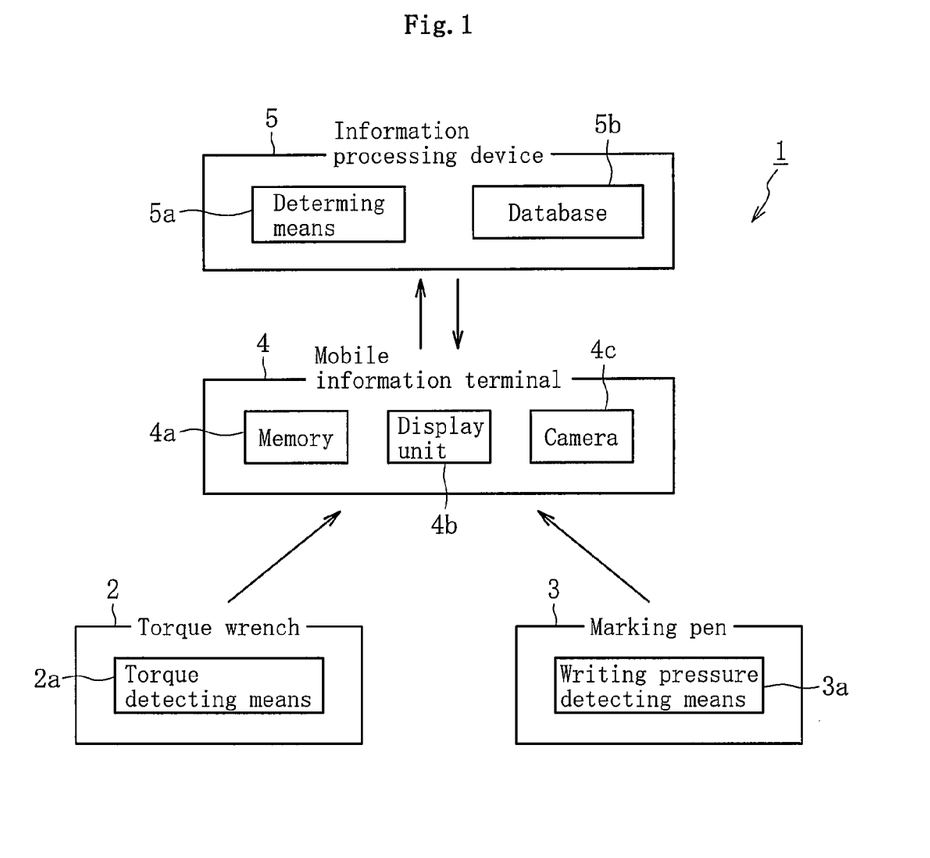
FIG. 1 is a concept view showing a fastening part tightening management system according to an embodiment of the present invention.
Figure 3:
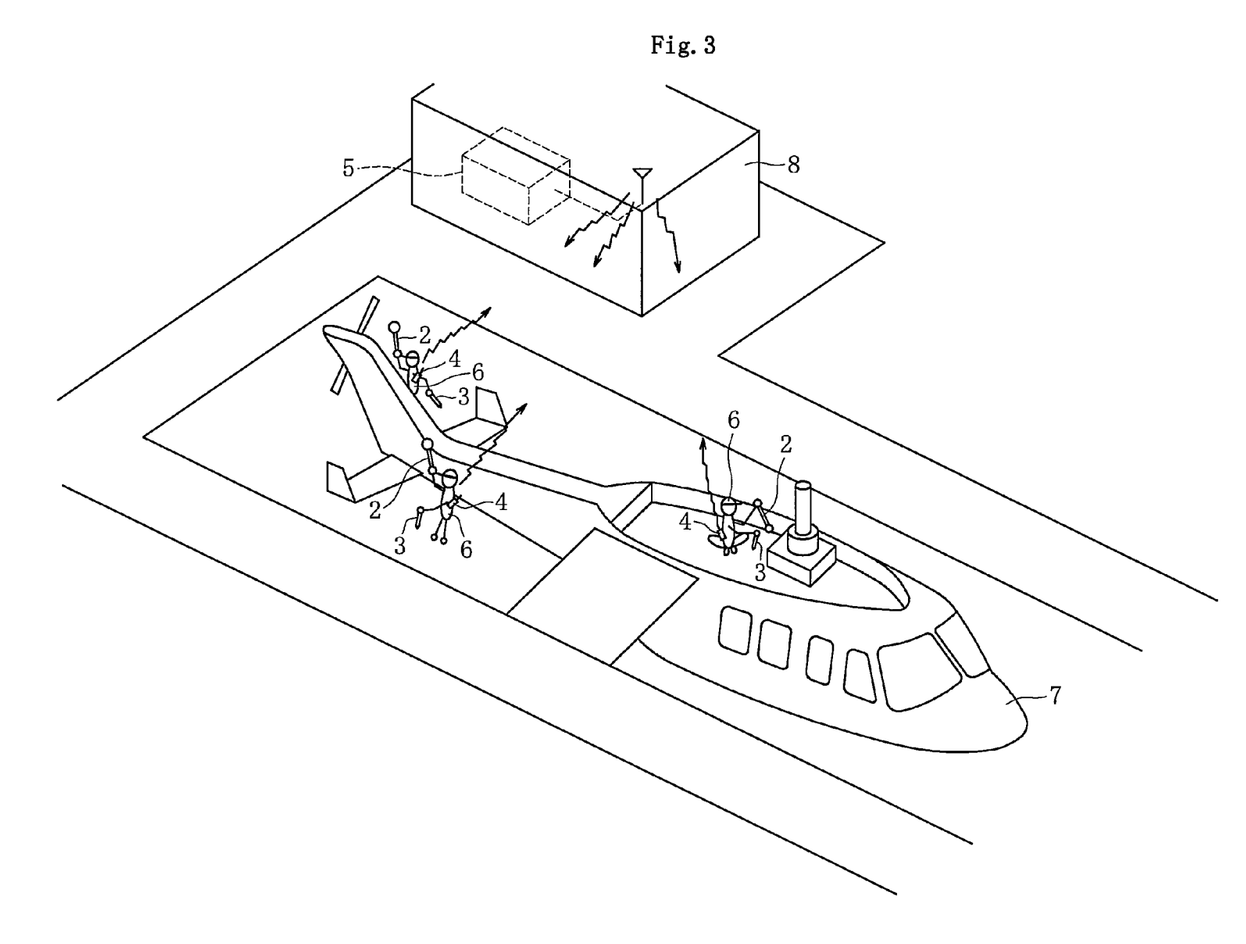
FIG. 3 is a diagram showing operation conditions of an aircraft assembling process to which the fastening part tightening management system according to the embodiment is applied.

FIG. 1 is a diagram showing a schematic configuration of a fastening part tightening management system according to an embodiment of the present invention. As shown in FIG. 1, a fastening part tightening management system 1 according to the embodiment includes a manual torque wrench 2, a marking pen 3, a mobile information terminal (PDA) 4 serving as an information terminal, and an information processing device 5. The manual torque wrench 2, the marking pen 3, and the mobile information terminal 4 are carried by an operator 6 who performs a tightening operation for a fastening part as shown in FIG. 3. As the fastening part, for example, a screw, a bolt, a nut, or the like is given. However, a case using a screw as a fastening part will be described below as an example.

The manual torque wrench 2 is configured by a preset torque wrench having an adjustable set torque. The torque wrench 2 includes torque detecting means 2a that detects tightening torque information acting on a screw in a screw tightening operation, so that the tightening torque information detected by the torque detecting means 2a is wirelessly transmitted. In the embodiment, a value of distortion acting on the torque wrench 2 is detected by a distortion gauge or the like, and the value of distortion or a value obtained by converting the value of distortion into a torque value is used as the tightening torque information.

The marking pen 3 includes writing pressure detecting means 3a that detects a writing pressure generated at a pen point when marking is performed on a screw. When the writing pressure is detected by the writing pressure detecting means 3a, marking completion information is wirelessly transmitted. As the writing pressure detecting means 3a, for example, means for detecting distortion at the pen point occurring when a writing pressure acts on the pen point, means for detecting movement of a pen point that is configured to be slightly depressed into a main body when a writing pressure acts on the pen point, and the like are given.

The mobile information terminal 4 is designed to receive tightening torque information transmitted from the manual torque wrench 2 and marking completion information transmitted from the marking pen 3. The mobile information terminal 4 includes a memory 4a serving as storage means. After the received tightening torque information and the received marking completion information are stored in the memory 4a, the pieces of information are wirelessly transmitted. More specifically, the tightening torque information and the marking completion information are designed to be transmitted through the mobile information terminal 4. In the embodiment, the mobile information terminal 4 includes a display unit 4b that displays predetermined information and a camera 4c serving as information input means to input various pieces of identification information described by a two-dimensional bar-code (for example, a QR code (trademark)) or the like. In the embodiment, as will be described below, the camera 4c of the mobile information terminal 4 reads, as pieces of identification information related to a screw tightening operation, (1) air frame identification information, (2) operation identification information given to each operation step, (3) part identification information, and (4) torque wrench identification information.

The information processing device 5 is designed to receive the tightening torque information and the marking completion information transmitted from the mobile information terminal 4. The information processing device 5 includes determining means 5a that determines a state of a screw tightening operation based on the received tightening torque information and the received marking completion information and a database 5b in which various pieces of information are stored. A determination result obtained by the determining means 5a is transmitted to the mobile information terminal 4 and displayed on the display unit 4b of the mobile information terminal 4, so that the operator 6 is notified of the determination result. The mobile information terminal 4 may notify the operator 6 of the determination result of the determining means 5a with voice (including a case simultaneously using a display on the display unit 4b).

A management procedure of a tightening operation for a fastening part performed by the fastening part tightening management system configured as described above will be described below.

Figure 2:
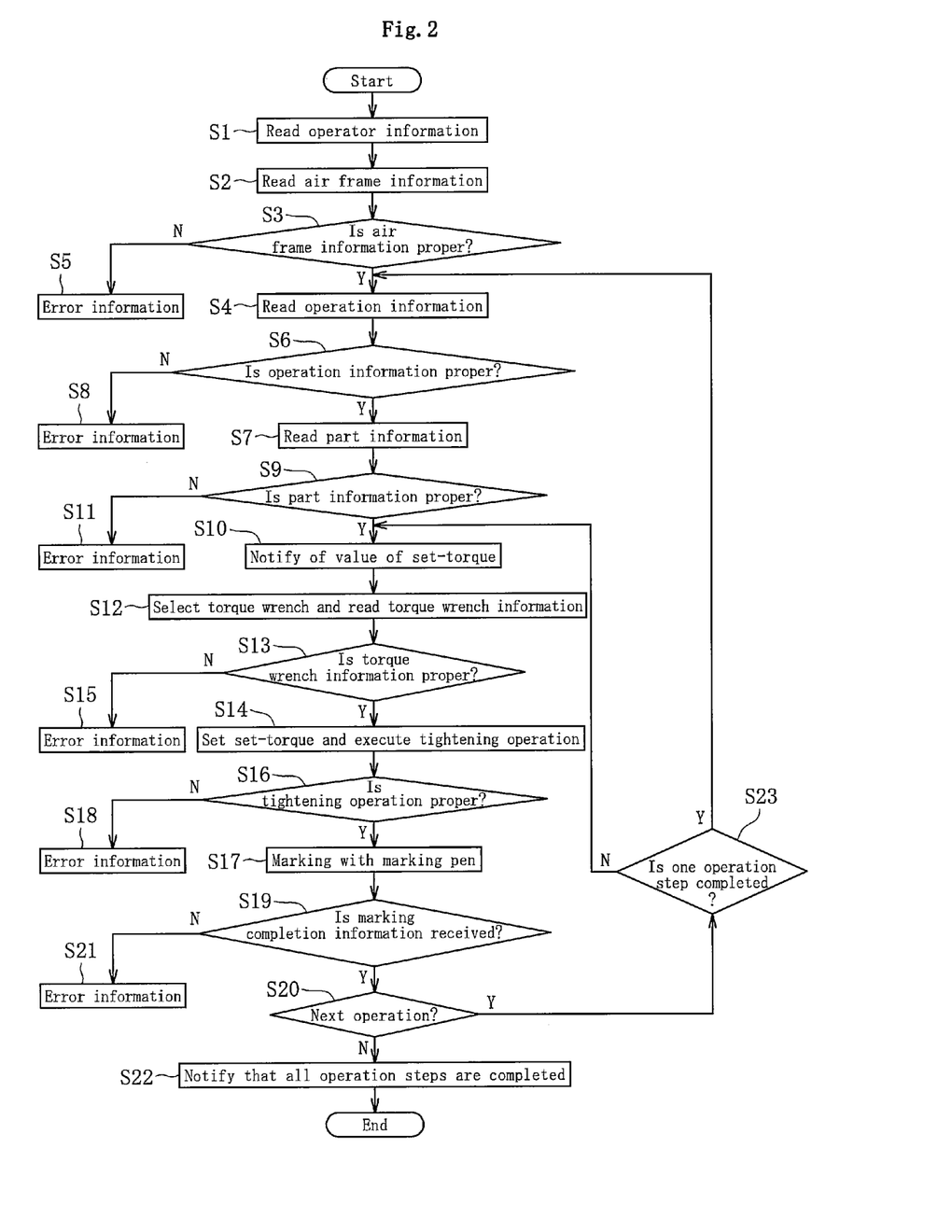
FIG. 2 is a flow chart showing a management procedure of a tightening operation for a fastening part by the fastening part tightening management system according to the embodiment.

As shown in FIG. 2, in the fastening part tightening management system 1, in the first step S1, the operator 6 reads operator identification information given to his/her own name plate or the like with the camera 4c of the mobile information terminal 4. The read operator identification information is transmitted from the mobile information terminal 4 to the information processing device 5. The information processing device 5, based on the operator identification information, reads detailed information (operation procedure information) of operations allocated to the operator 6 from the database 5b.

Next, in step S2, the operator 6, according to an instruction from the mobile information terminal 4, reads air frame identification information of an aircraft described in operating instructions with the camera 4c of the mobile information terminal 4. The read air frame identification information is transmitted from the mobile information terminal 4 to the information processing device 5. Thereafter, the operation shifts to step S3, and the determining means 5a of the information processing device 5 collides the air frame identification information with the detailed information of the operations read in step S1 to determine whether both the pieces of information coincide with each other. As a result, when both the pieces of information coincide with each other to determine that the read air frame identification information of the aircraft is proper, the information processing device 5 transmits information representing that the information is proper to the mobile information terminal 4, and the operator 6 is notified of an instruction representing that the operation shifts to the next step S4. As a notification method from the mobile information terminal 4 to the operator 6, not only a display on the display unit 4b of the mobile information terminal 4 but also simultaneous use of the display and voice or use of only the voice may be used. Choice of the notification methods is similarly applied to various notifications from the mobile information terminal 4 to the operator 6 (will be described later). On the other hand, when the determining means 5a of the information processing device 5 determines that the read air frame identification information is improper, the operation shifts to step S5, the information processing device 5 transmits information representing that the air frame information is improper to the mobile information terminal 4, and the mobile information terminal 4 notifies the operator 6 of error information. When the operation shifts from step S3 to step S5 as described above, the operator 6 must read the correct air frame identification information of the aircraft to start the next step S4.

In step S4, the operator 6, according to an instruction from the mobile information terminal 4, reads pieces of operation identification information given to operation steps described in the operating instructions with the camera 4c of the mobile information terminal 4. The read operation identification information is transmitted from the mobile information terminal 4 to the information processing device 5. Thereafter, the operation shifts to step S6, the determining means 5a of the information processing device 5 collides the operation identification information with the detailed information of the operation read in step S1 to determine whether both the pieces of information coincide with each other. As a result, when both the pieces of information coincide with each other to determine that the read operation identification information is proper, the information processing device 5 transmits information representing that the information is proper to the mobile information terminal 4, and the mobile information terminal 4 notifies the operator 6 of an instruction representing that the operation shifts to the next step S7. On the other hand, when the determining means 5a of the information processing device 5 determines that the read operation identification information is improper, the operation shifts to step S8, the information processing device 5 transmits information representing that the operation identification information is improper to the mobile information terminal 4, and the mobile information terminal 4 notifies the operator 6 of error information. When the operation shifts from step S6 to step S8 as described above, the operator 6 must read correct operation identification information to start the next step S7.

In step S7, the operator 6, according to an instruction from the mobile information terminal 4, reads part identification information given to a constituent part of the aircraft with the camera 4c of the mobile information terminal 4. The read part identification information is transmitted from the mobile information terminal 4 to the information processing device 5. Thereafter, as step S9, the determining means 5a of the information processing device 5 collides the part identification with the detailed information of the operation read in step S1 to determine whether both the pieces of information coincide with each other. As a result, when both the pieces of information coincide with each other to determine that the read part identification information is proper, the information processing device 5 transmits information representing that the information is proper to the mobile information terminal 4, and the mobile information terminal 4 notifies the operator 6 of an instruction representing that the operation shifts to the next step S10. On the other hand, when the determining means 5a of the information processing device 5 determines that the read part identification information is improper, the operation shifts to step S11, the information processing device 5 transmits information representing that the part identification information is improper to the mobile information terminal 4, and the mobile information terminal 4 notifies the operator 6 of error information. When the operation shifts from step S9 to step S11, the operator 6 must read correct part identification information to start the next step S10.

In step S10, set torque information of the torque wrench 2 corresponding to the constituent part is transmitted from the information processing device 5 to the mobile information terminal 4, and the mobile information terminal 4 notifies the operator 6 of a value of a set torque to be set for the torque wrench 2. At the same time, the operation shifts to step S12, the mobile information terminal 4 notifies the operator 6 of an instruction representing that the torque wrench 2 is selected, the operator 6 selects an appropriate torque wrench 2 from torque wrenches 2 of several types, and torque wrench identification information given to the torque wrench 2 is read with the camera 4c of the mobile information terminal 4. The read torque wrench identification information is transmitted from the mobile information terminal 4 to the information processing device 5.

In step S13, the determining means 5a of the information processing device 5 collates the torque wrench identification information with detailed information of the operation read in step S1 to determine whether both the pieces of information coincide with each other. More specifically, in the database 5b of the information processing device 5, information including available ranges (settable ranges of set torques) of tightening torques of the torque wrenches 2 and a deadline for examination is recorded. When the value of the set torque that is notified of is included in the available range of the tightening torque of the torque wrench 2 represented by the read torque wrench identification information and when the deadline for examination does not have passed, it is determined that the torque wrench identification information coincides with the detailed information of the operation read in step S1. As a result, when both the pieces of information coincide with each other to determine that the read torque wrench identification information is proper, the information processing device 5 transmits information representing that the information is proper to the mobile information terminal 4, and the mobile information terminal 4 notifies the operator 6 of an instruction representing that the operation shifts to the next step S14. On the other hand, when the determining means 5a of the information processing device 5 determines that the read torque wrench identification information is improper, the operation shifts to step S15, the information processing device 5 transmits information representing that the information is improper to the mobile information terminal 4, and the mobile information terminal 4 notifies the operator 6 of error information. In this manner, when the operation shifts from step S13 to step S15, the operator 6 must read correct torque wrench identification information to start the next step S14.

In step S14, the mobile information terminal 4 notifies the operator 6 of an instruction representing that a set torque is set for the torque wrench 2 and that a screw tightening operation is executed with the torque wrench 2, and the operator 6 executes the screw tightening operation according to the instruction. At this time, the operator 6 is notified of information including a tightening position or the like through the mobile information terminal 4. While the tightening operation is executed, as shown in FIG. 1, pieces of tightening torque information acting on screws are detected by the torque detecting means 2a of the torque wrench 2, and the pieces of tightening torque information are sequentially transmitted to the information processing device 5 through the mobile information terminal 4.

In step S16, the determining means 5a of the information processing device 5 determines whether a screw is tightened up to the value of the set torque of which the operator 6 is notified based on the tightening torque information to determine whether a screw tightening operation is proper. As a result, when it is determined that the screw tightening operation is properly ended, the information processing device 5 transmits information representing that the tightening operation is proper to the mobile information terminal 4, and the mobile information terminal 4 notifies the operator 6 of an instruction representing that the operation shifts to the next step S17. On the other hand, when the determining means 5a of the information processing device 5 determines, based on the tightening torque information, that the screw tightening operation is improper (for example, overtorque/undertorque), the operation shifts to step S18, the information processing device 5 transmits information representing that the screw tightening operation is improper to the mobile information terminal 4, and the mobile information terminal 4 notifies the operator 6 of error information. When the operation shifts from step S16 to step S18, the operator 6 retries the screw tightening operation to start the next step S17, and must tight the screw with a proper set torque.

In step S17, the mobile information terminal 4 notifies the operator 6 of an instruction to mark the screw, the tightening operation of which is properly ended with the marking pen 3, and the operator 6 marks the corresponding screw according to the instruction. At this time, as shown in FIG. 1, the writing pressure detecting means 3a of the marking pen 3 detects a writing pressure acting on the pen point, and the marking pen 3 transmits marking completion information. The marking completion information is transmitted to the information processing device 5 through the mobile information terminal 4.

In step S19, the determining means 5a of the mobile information terminal 4 determines the presence/absence of reception of the marking completion information. As a result, when it is determined that the information processing device 5 properly receives the marking completion information, the operation shifts to step S20, and the determining means 5a of the information processing device 5 determines whether the operator 6 has the next operation. On the other hand, when new tightening torque information is received until the marking completion information is received after it is determined that the screw tightening operation is properly ended, the operation shifts to step S21, the information processing device 5 transmits information representing that the marking completion information is not received to the mobile information terminal 4, and the mobile information terminal 4 notifies the operator 6 of error information. When the operation shifts from step S19 to step S21, the operator 6 must mark the screw, the tightening operation of which is properly ended with the marking pen 3 to start the next step S20.

In step S20, as described above, the determining means 5a of the information processing device 5 determines whether the operator 6 has the next operation. As a result, when it is determined that the next operation is not present, the operation shifts to step 22, and the operator 6 is notified that all the operation steps are ended through the mobile information terminal 4. On the other hand, when it is determined that the next operation is present, the operation further shifts to step 23, the determining means 5a of the information processing device 5 determines whether all operations included in one operation step described in operating instructions are completed. As a result, when it is determined whether all the operations included in one operation step are completed, the operation returns to step S4 to instruct the operator 6 to perform another new operation step. On the other hand, when it is determined whether all the operations included in one operation step are not completed, the operation returns to step S10 to instruct the operator 6 to perform another operation included in the same operation step. Finally, in step S20, the above procedure is repeated until it is determined that all the operations of the operator 6 are completed.

As shown in FIG. 3, when the fastening part tightening management system 1 according to the embodiment is applied to an actual assembling process for an aircraft 7, the plurality of operators 6 simultaneously perform screw tightening operations in parallel with each other. Each of the operators 6 carries the torque wrench 2, the mobile information terminal 4, the marking pen 3, and operating instructions (not shown). The information processing device 5 is housed in a management room 8 installed near a site of assembling process (second floor in an illustrated example), and is designed to communicate (wirelessly communicate) with the mobile information terminal 4 carried by each of the operators 6 by using a radio wave.

As described above, according to the fastening part tightening management system 1 of the embodiment, when the operator 6 performs a screw tightening operation by using the torque wrench 2, tightening torque information is transmitted from the torque wrench 2. When the operator 6 marks the screw, the tightening operation of which is ended with the marking pen 3 to make it possible to visually check the screw, the tightening operation of which is ended, the marking pen 3 transmits marking completion information. Based on the tightening torque information and the marking completion information, a tightening state of the screw is determined. More specifically, it can be determined based on the tightening torque information whether the screw is tightened up to a proper tightening torque, and it can be reliably confirmed based on a marking completion signal that a screw, the tightening operation of which is properly ended is marked. Since the operator 6 is sequentially notified of the determination results of the information processing device 5 through the mobile information terminal 4, even one operator 6 can tighten the screw up to the proper tightening torque by herself/himself while preventing the screw from being forgotten to be tightened. Thus, in the assembling process for the aircraft 7, even one operator 6 can realize a reliable screw tightening operation by herself/himself, and a reduction in assembly cost of the aircraft 7 can be reliably achieved.

Since the tightening torque information and the marking completion information are stored in the memory 4a of the mobile information terminal 4, even though a communication state between the mobile information terminal 4 and the information processing device 5 becomes temporarily poor, the tightening torque information and the marking completion information stored in the memory 4a can be re-transmitted after the communication states between the mobile information terminal 4 and the information processing device 5 is improved. For this reason, both the pieces of information can be reliably transmitted to the information processing device 5. Thus, since an operation state of the operator 6 can be more reliably managed by the information processing device 5, the reliability of the screw tightening operation can be very advantageously improved.

The present invention is not limited to the above embodiment, and can be executed in various modes. For example, the above embodiment describes that tightening torque information detected by the torque wrench 2 and marking completion information detected by the marking pen 3 are transmitted to the information processing device 5 through the mobile information terminal 4. However, the pieces of information may be directly transmitted from the torque wrench 2 and the marking pen 3 to the information processing device 5 without through the mobile information terminal 4.

DESCRIPTION OF REFERENCE SIGNS

1: Tightening management system
2: Manual torque wrench
2a: Torque detecting means
3: Marking pen
3a: Writing pressure detecting means
4: Mobile information terminal
4a: Memory
4b: Display unit
4c: Camera
5: Information processing device
5a: Determining unit
5b: Database
6: Operator

The invention claimed is:

1. A fastening part tightening management system that manages a tightening state of a fastening part to fix a constituent part of an aircraft in an aircraft assembling process, the fastening part tightening management system comprising:
   a plurality of manual torque wrenches each of which tightens a fastening part of a plurality of fastening parts up to a set torque while activating a tightening torque and each of which detects and transmits tightening torque information acting on the corresponding fastening part;
   a marking pen for each of the plurality of manual torque wrenches that performs marking to a corresponding one of the fastening parts, the tightening operation of which is ended by the corresponding manual torque wrench, detects the marking operation, and transmits marking completion information;
   an information processing device that determines a tightening state of each of the fastening parts based on the corresponding tightening torque information and the corresponding marking completion information; and
   a plurality of information terminals corresponding to the plurality of manual torque wrenches, each of the plurality of information terminals notifying an operator of a corresponding determination result obtained by the information processing device.

2. The fastening part tightening management system according to claim 1, wherein
   for each of the plurality of manual torque wrenches and corresponding one of the marking pens, at least one of the corresponding tightening torque information and the corresponding marking completion information is transmitted to the information processing device through the corresponding information terminal.

3. The fastening part tightening management system according to claim 2, wherein
   each of the information terminals includes storage means that stores information transmitted to the information processing device through the information terminal, the information including the at least one of the corresponding tightening torque information and the corresponding marking completion information.

4. The fastening part tightening management system according to claim 3, wherein
   each of the information terminals includes information input means to input identification information related to the tightening operation for the corresponding fastening part, and the identification information is transmitted to the information processing device.

5. The fastening part tightening management system according to claim 4, wherein
the information processing device includes storage means that stores operation procedure information of each of the tightening operations for the fastening parts, and determination means that compares the identification information related to one of the tightening operations with the corresponding operation procedure information to determine whether the tightening operation is proper.

6. The fastening part tightening management system according to claim 2, wherein
each of the information terminals includes information input means to input identification information related to the tightening operation for the corresponding fastening part, and the identification information is transmitted to the information processing device.

7. The fastening part tightening management system according to claim 6, wherein
the information processing device includes storage means that stores operation procedure information of each of the tightening operations for the fastening parts, and determination means that compares the identification information related to one of the tightening operations with the corresponding operation procedure information to determine whether the tightening operation is proper.

8. The fastening part tightening management system according to claim 1, wherein
each of the information terminals includes information input means to input identification information related to the tightening operation for the corresponding fastening part, and the identification information is transmitted to the information processing device.

9. The fastening part tightening management system according to claim 8, wherein
the information processing device includes storage means that stores operation procedure information of each of the tightening operations for the fastening parts, and determination means that compares the identification information related to one of the tightening operations with the corresponding operation procedure information to determine whether the tightening operation is proper.

* * * * *